Jan. 12, 1932.  C. SEMENITZ  1,841,063
EPISCOPIC PROJECTION APPARATUS FOR METALLIC FILMS AND THE LIKE
Filed Aug. 9, 1930
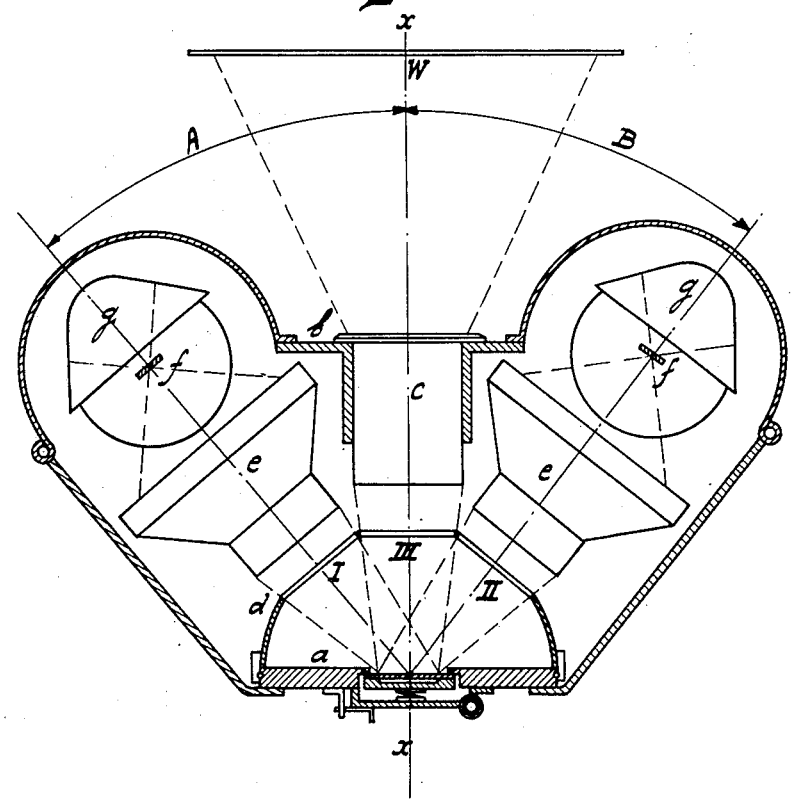
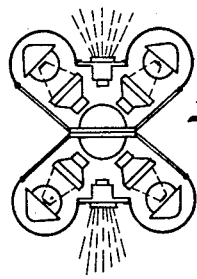
Inventor:-
Christian Semenitz
by
Langmur, Parry, Card & Langmur
Attys.

Patented Jan. 12, 1932

1,841,063

UNITED STATES PATENT OFFICE

CHRISTIAN SEMENITZ, OF BERLIN, GERMANY, ASSIGNOR TO REINOLD KUPFER, OF BERLIN, GERMANY

EPISCOPIC PROJECTION APPARATUS FOR METALLIC FILMS AND THE LIKE

Application filed August 9, 1930, Serial No. 474,218, and in Germany July 4, 1927.

This invention for which application has been filed in Germany, July 4, 1927, has reference to episcopic projection apparatus for pictures on metal and other opaque substances in which the gate aperture is surrounded by an internally reflecting hollow body which is arranged centrally to the optical axis of the gate aperture and is lighted by two or more lamps. Projecting apparatus of this kind are already known but hitherto they have been little used in cinematography as they have no device for preventing stray light (i. e. light rays which are not coming from the area of image but from the source of light directly or from a reflector) from getting into the pupil of incidence of the objective. The device according to the invention remedies this inconveniency by arranging the lamps outside the hollow body which is provided with corresponding apertures for the access of light.

In order that the invention may be clearly understood and readily carried into effect one form of construction according to the invention is described more fully with reference to the accompanying drawing.

The area of image $a$ is lighted at equal angles through apertures I and II by sources of light $f$ external to the internally reflecting hollow body which is arranged in known manner centrally to the optical $x$—$x$. The light rays reflected by the area of image $a$ and not traversing the aperture III are thrown back on to the picture by the reflecting surface of the hollow body $d$ and serve to further light the picture. In order to ensure the greatest luminous efficiency possible the reflectors $g$ are arranged behind the sources of light $f$ and condensers $e$ are arranged between the sources of light $f$ and the area of image $a$. The objective $c$ supported upon the carrier plate $b$ throws the picture appearing in the area of image $a$ through aperture III on to the screen $w$. The hollow body $d$ may be journalled so as to be adapted to rotate about its axis of symmetry $x$—$x$ and to serve as an obturator in which it is moved so that it only turns the apertures I and II towards the sources of light $f$ when the picture is stationary in the area of image $a$.

What I claim is:—

1. An episcopic projection device for metallic films and the like, comprising means defining a gate aperture, an internally reflecting hollow body disposed about the said gate aperture and centrally with respect to its optical axis, and having apertures for the access of light, a plurality of lamps disposed externally of said hollow body for illuminating said gate aperture through the apertures in said hollow body, and a hooded, outwardly flared, condenser cooperating with each of said light sources and disposed between said light sources and the hollow body, and producing and confining a cone of light converging on the gate aperture.

2. An episcopic projection device for metallic films and the like, comprising means defining a gate aperture, an internally reflecting hollow body rotatably journalled on said means and serving as a shutter and disposed centrally with respect to the optical axis of the aperture, and having apertures for the access of light, and a plurality of lamps disposed externally of said hollow body and adapted to illuminate the gate aperture through the said apertures in the hollow body.

In testimony whereof I have signed my name to this specification.

CHRISTIAN SEMENITZ.